United States Patent [19]
Morrisroe

[11] Patent Number: 4,490,071
[45] Date of Patent: Dec. 25, 1984

[54] ARTIFICIAL SEAWEED AND METHOD OF ACCRETING WATERFRONTS

[76] Inventor: John P. Morrisroe, 283 Park Dr., Palatine, Ill. 60067

[21] Appl. No.: 459,707

[22] Filed: Jan. 21, 1983

[51] Int. Cl.$^3$ .............................................. E02B 3/04
[52] U.S. Cl. ......................................... 405/24; 405/21
[58] Field of Search ..................... 405/24, 25, 15, 23, 405/16; 119/3

[56] References Cited

U.S. PATENT DOCUMENTS

| | | | |
|---|---|---|---|
| 3,299,640 | 1/1967 | Nielsen | 405/24 |
| 3,540,415 | 11/1970 | Bromley | 119/3 |
| 3,559,407 | 2/1971 | Schuur | 405/24 |
| 3,590,585 | 7/1971 | DeWinter | 405/24 |
| 3,726,096 | 4/1973 | Bahre | 405/24 |
| 3,727,411 | 4/1973 | Rhodes | 405/24 |
| 3,820,339 | 6/1974 | Luque | 405/24 |
| 4,221,500 | 9/1980 | Garrett | 405/24 |

*Primary Examiner*—Dennis L. Taylor
*Attorney, Agent, or Firm*—Hill, Van Santen, Steadman & Simpson

[57] ABSTRACT

Artificial "seaweed" or anti-erosion devices placed in waters where shoreline erosion occurs work with nature to accrete water bottom sediment, such as sand, to establish and maintain beaches along shorelines. The seaweed is planted outwardly from the shoreline in predetermined locations to form rows of buoyant flexible finger sheets effective to trap sediment suspended in the water. The sheets are anchored to water pervious elongated hollow flexible tubes filled with lake bottom sediment as they are deployed and have low density floats sealed therein to increase their buoyancy. For efficient accretion, the still water level and the lake bottom profile are determined. The tubes are then deployed in lake bottom troughs and on mounds outwardly from the shoreline to form rows of finger sheets generally parallel with the shoreline. The heights of the fingers are regulated to always terminated well below the still water line where they will not interfere with boat traffic or become locked in ice formed on the water, and with fingers of short height extending from the low level troughs where the sediment content of the water is high and with longer fingers extending from the mounds where the water suspends less solids.

6 Claims, 13 Drawing Figures

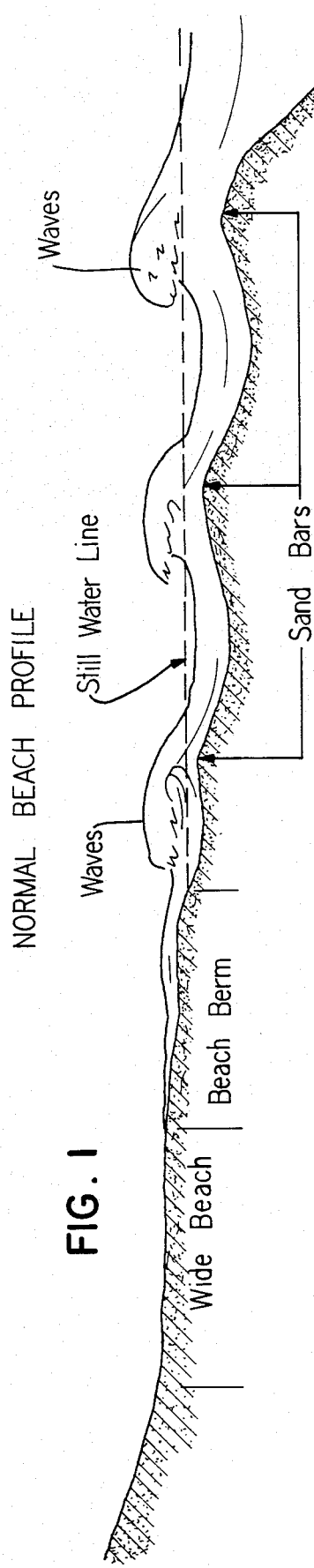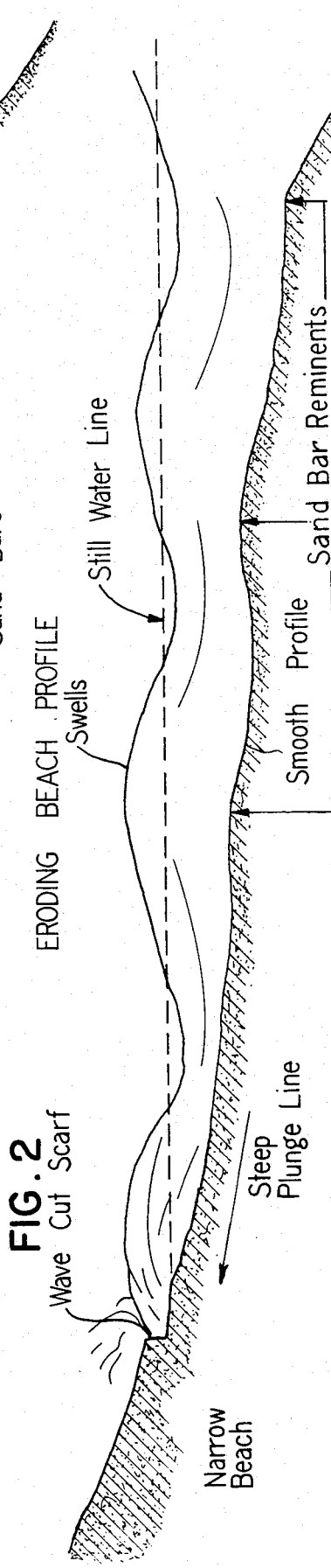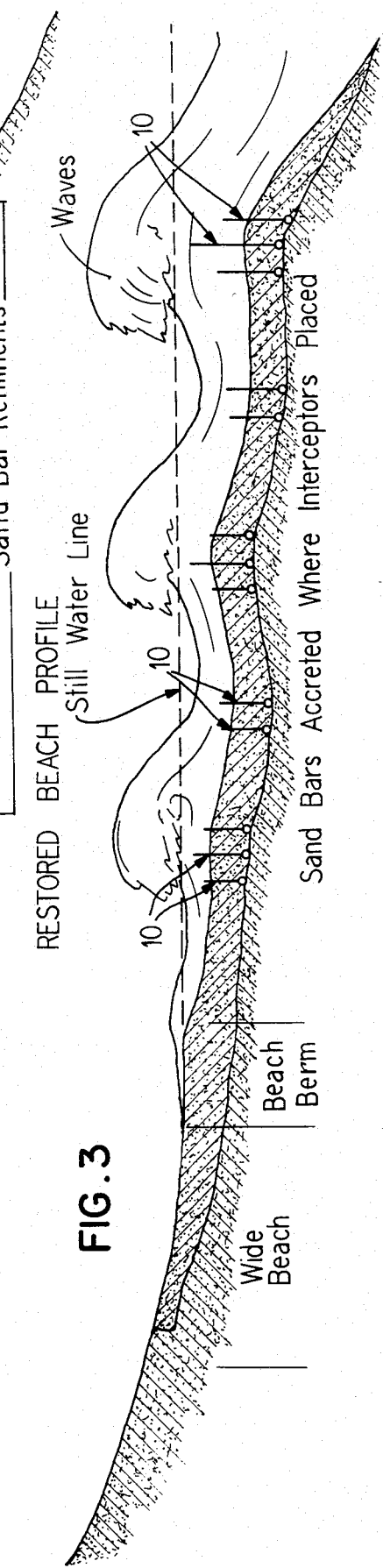

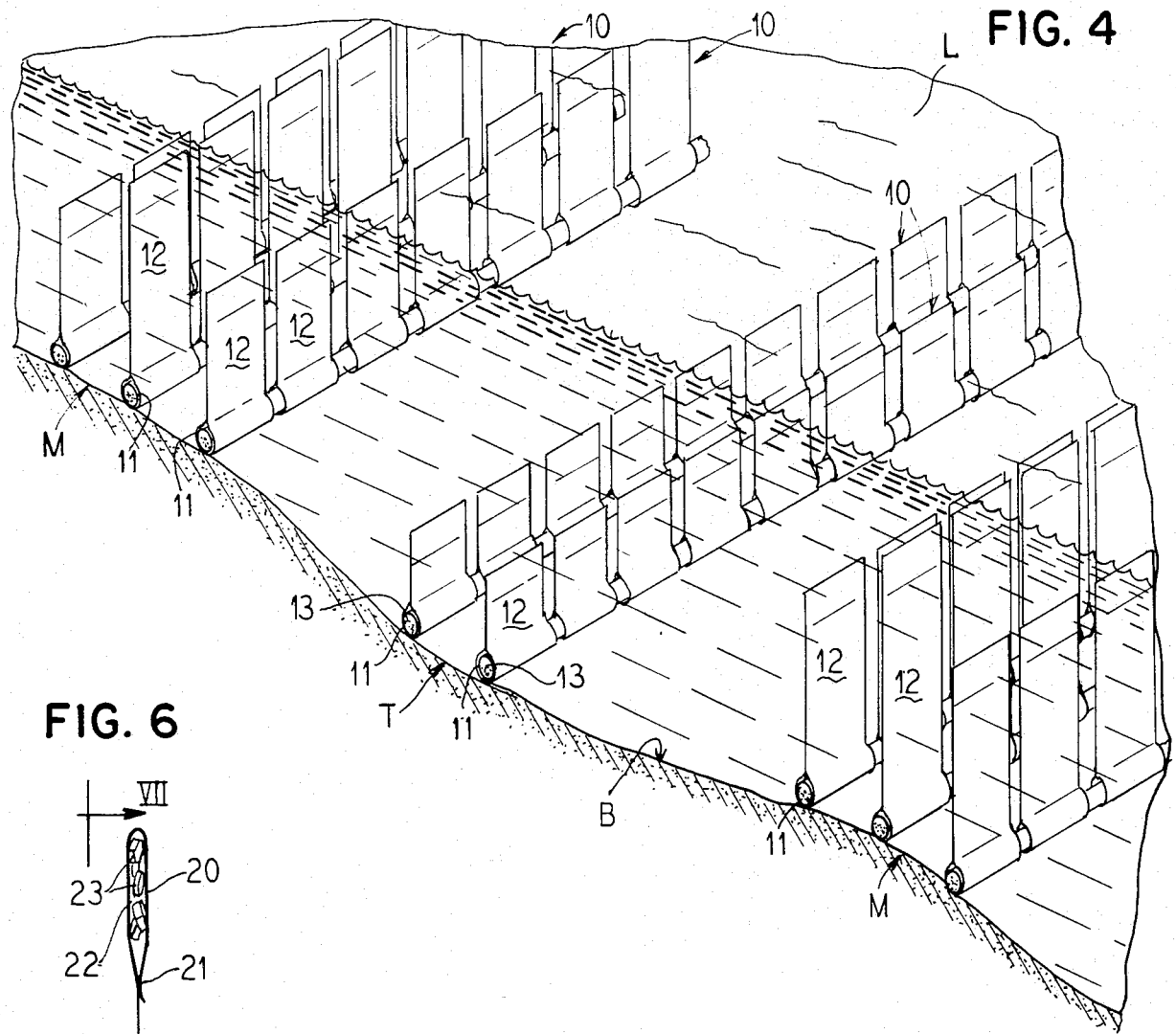
FIG. 4
FIG. 6
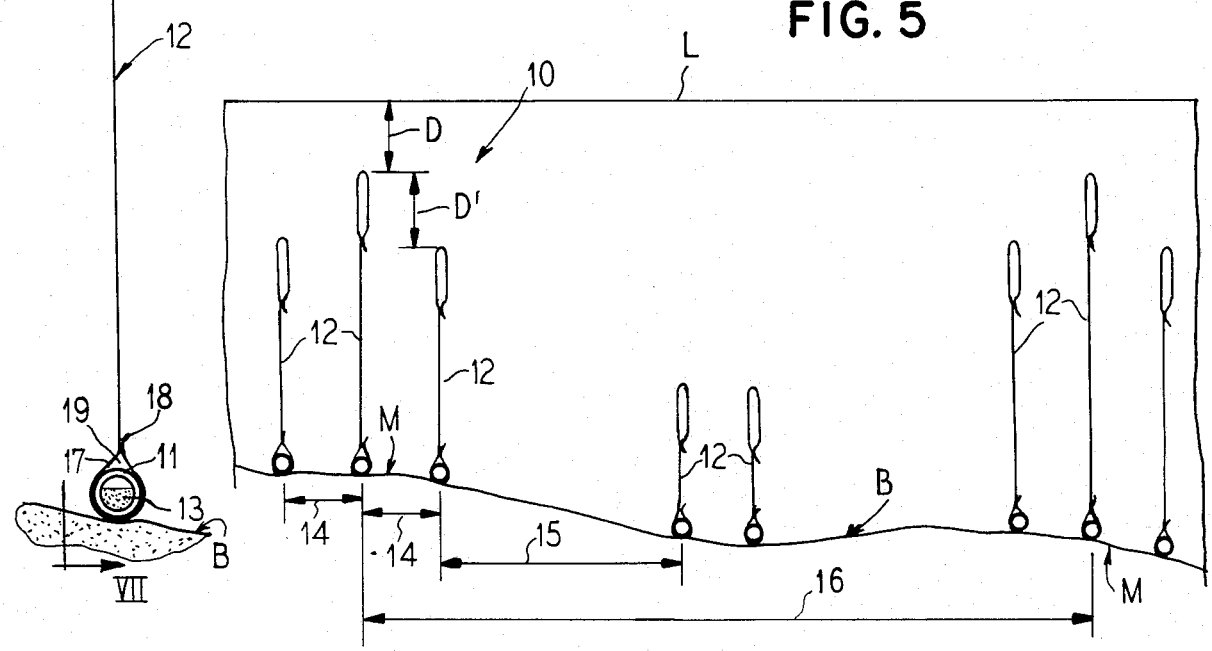
FIG. 5

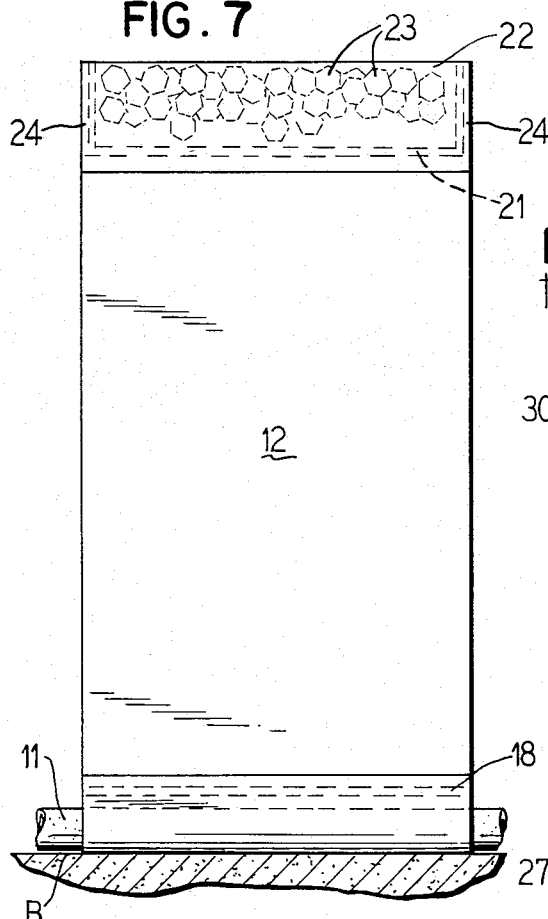
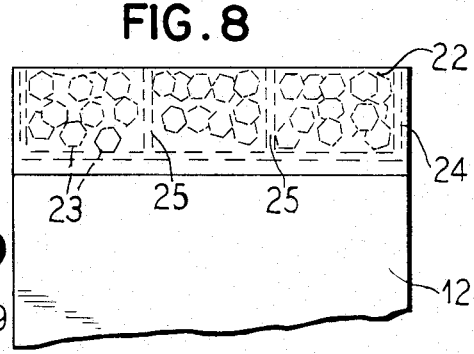
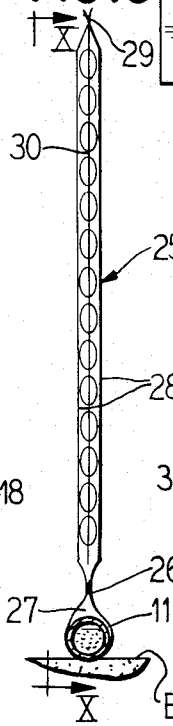
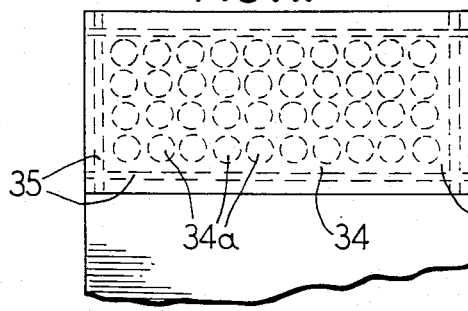
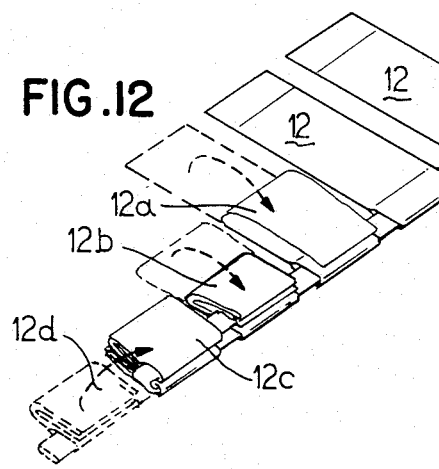
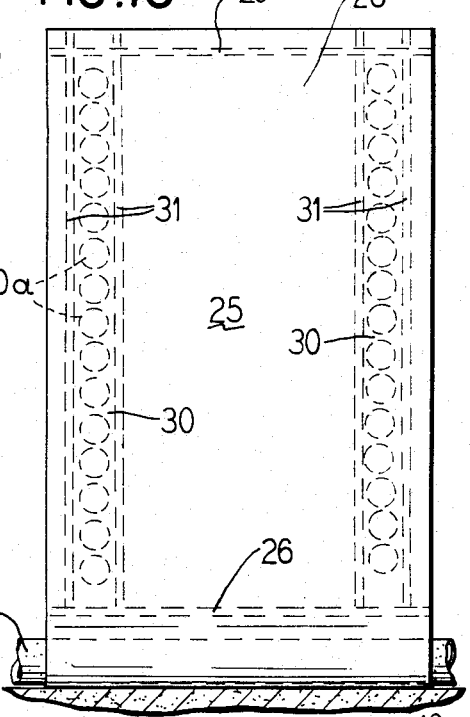
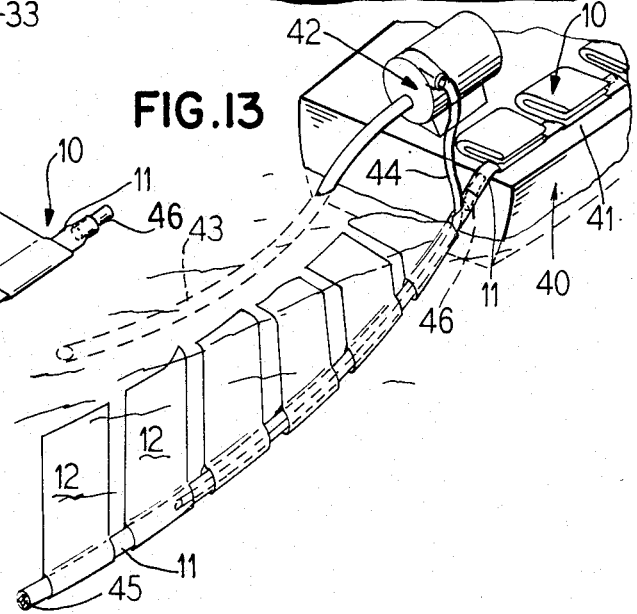

ARTIFICIAL SEAWEED AND METHOD OF ACCRETING WATERFRONTS

BACKGROUND OF THE INVENTION

1. Field of the Invention

This invention relates to the art of maintaining and reclaiming beaches on water front shorelines with flexible anti-erosion devices that work with nature to trap sediment such as sand for accreting the lake bed and specifically deals with artificial seaweed having elongated hollow porous tubes filled with lake bed sediment forming anchors for upstanding flexible buoyant finger sheets with low density floats trapped therein to increase their buoyancy. The invention includes a method of installing the seaweed to most effectively build up the lake bottom.

2. Description of the Prior Art

Heretofore known artificial "seaweed" arrangements for building up deposits on a lake bed have been expensive, are difficult to deploy, have flattened out and shifted during storms, and have not been positioned to most effectively build up the lake bed.

It would therefore be an improvement in this art to provide artificial seaweed or anti-erosion devices with flexible, high, buoyant finger sheets that will remain upright in rough water at their initially installed positions to efficiently trap and deposit sediment suspended in the water on the lake bed bottom over anchors to which the fingers are affixed, and to anchor these sheets in troughs and mounds of the lake bottom forming a series of spaced rows in the water outwardly from and generally parallel with the shore.

BRIEF SUMMARY OF THE INVENTION

According to this invention, artificial seaweed or anti-erosion devices are provided in the form of elongated porous tubes with buoyant finger sheets secured to one end to the tube to project laterally thereform to free ends. The tubes are preferably made from flexible felted plastic water resistent fibers. A suitable felted porous plastic sheet material is commercially available under the tradename "Supac" from Phillips Chemical Co., Bartlesville, Okla. In general, the tubes have a diameter of from 8 to 12", preferably 10", and lengths that can be conveniently deployed from a boat or barge, generally from 50 to 100 feet, and adapted to be connected end-to-end. The plastics material should have a high density, be tough and flexible throughout a wide temperature range, resistent to marine environments, and strong enough to be filled with a slurry of lake bottom sediment such as sand without bursting as it is deployed along a lake bottom. While porous plastic sheet material is preferred, impervious plastic sheet or film material could be used with screened ends on the tube or with holes in the tops of the tubes accommodating discharge of water while retaining the sediment in the tubes. In general, high density polyester films or sheets can be used for the tube material. Polyethylene sheet material is a specific example.

The tube lengths carry a plurality of spaced finger sheets along the length thereof. These sheets may be from 2 to 6, preferably 4 feet wide, and have heights or lengths determined by the depth of the water into which they are to be deployed so as to always terminate well below the still water level where they will not foul boats or propellers and will be below the level of ice formed on the water. In general heights of from 2 to 15 feet are convenient. The sheets are formed from low density plastics film, such as inexpensive polyesters about 10 mils thick with a low stretch factor, a resistance to marine environment, and a high flexibility over a wide temperature range. Polyethylene is a specific material. The material should have a specific gravity less than 1, preferably around 0.9. Suitable low density plastic material sheets are commercially available from a number of suppliers such as DuPont de Nemours Company, Wilmington, Del. under tradenames "TYVEK" and "TYPAR"; and A.D.E. Corporation, Chicago, Ill., under tradenames "MUSCEL" and "NESCEL".

The sheets are rendered more buoyant with low density floats such as bubble pack strips, hollow plastic beads or balls, low density pillows of plastic material commonly used to float on electroplating baths, etc.

The finger sheets, in one arrangement, have one end wrapped around the tube and sealed adjacent the tube with the opposite free end wrapped around the floats forming one or more pockets which are sealed to trap the floats at desired locations and protect them from the marine environment. In another arrangement the finger sheet is wrapped around the tube with adjoining legs extending all the way to the free ends of the sheet. Strips of floats, such as bubble pack material are then trapped between the legs which are sealed together to form pockets retaining the material at desired locations.

The tubes collapse into flat lengths. Each sheet is foldable into a compact stack on the tube, and the stacks are then folded together to form a compact package that is easily deployed into the water from a boat or barge.

To determine the optimum locations for deploying the seaweed, a survey of the lake bottom is made over an area outwardly from the shoreline for several hundred feet and along a length where the bottom is to be accreted. The trough and mound zones of the surveyed area are then marked and the still water level is determined. The seaweed is then deployed in rows outwardly from the dryland shoreline, for example with an inner row being positioned about 100 to 150 feet from the dryland shoreline and with successive outer rows being positioned in successive trough and mound zones.

The heights of the fingers are regulated so that none of the fingers will extend more than about 2 feet under the still water level. In addition, the heights of the fingers anchored in the low trough areas will be controlled to be less than the heights of the fingers anchored on the mound areas since it has been found that the solids concentration of the water above the troughs is heavier than the concentration in the water above the mounds. The shorter fingers are thus effective to build up sediment in the troughs while the longer fingers are more effective to build up sediment on the mounds.

The number of successive rows of seaweed is determined from the nature of the surveyed lake bottom profile with additional rows being deployed under conditions requiring accretion of a wide area. In general, a minimum of 2 to 3 mound anchored rows alternating with intermediate trough anchored rows are desirable.

BRIEF DESCRIPTION OF THE DRAWINGS

FIG. 1 is a diagrammatic view of a normal beach profile along a waterfront to illustrate the manner in which sand bars protect the beach berm to maintain a wide beach area.

FIG. 2 is a view similar to FIG. 1 but illustrating an eroded beach profile showing erosion of the profile of FIG. 1.

FIG. 3 is a view similar to FIGS. 1 and 2 illustrating the restoration of the beach profile by the properly positioned seaweed interceptors of this invention.

FIG. 4 is a pictoral perspective view of rows of artificial seaweed of this invention deployed in position on a lake bottom.

FIG. 5 is a somewhat diagrammatic transverse sectional view through the artificial seaweed of FIG. 4 to illustrate the positioning of the rows and the heights of the finger sheets in the respective rows.

FIG. 6 is a transverse sectional view through one of the finger sheets of FIGS. 4 and 5.

FIG. 7 is an elevational view along the line VII—VII of FIG. 6.

FIG. 8 is a fragmentary view similar to FIG. 7 illustrating the upper portion of an alternate finger construction.

FIG. 9 is an end elevational view of another finger construction.

FIG. 10 is a front elevation or face view of the finger construction of FIG. 9.

FIG. 11 is a view similar to FIG. 10 but illustrating another finger construction.

FIG. 12 is a perspective view illustrating the manner in which seaweed of this invention may be folded for deployment.

FIG. 13 is a view illustrating the manner in which the folded seaweed is deployed from a barge.

DETAILED DESCRIPTION OF THE INVENTION

FIG. 1 illustrates a normal beach profile where a wide dry beach area is protected by a gentle sloping beach berm area which in turn is protected by a series of sand bars outwardly from the shoreline causing waves to break thereby protecting the beach berm and the wide beach area.

FIG. 2 then illustrates the manner in which the wide beach area is destroyed when the sand bars are washed away so that the waves break over the berm cutting into the beach. In this profile the narrow beach has a sharp drop-off or scarf to a steep plunge line into deeper water where a relatively smooth bottom descends to the full lake depth leaving only remnants of mounds where sand bars formerly existed.

According to this invention the eroding beach is carefully surveyed for a considerable distance outwardly from the dry shoreline and the remnants of mounds of previously existing sand bars are located. Trough zones between the mounds are also located. The still water level is surveyed.

As illustrated in FIG. 3, according to this invention, a plurality of rows of artificial seaweed or interceptors 10 of this invention are deployed in the water outwardly from the dry shoreline and generally parallel therewith at trough and mound locations found in the survey. Three rows are illustrated on each remnant mound of the three sandbars of FIG. 1 and two rows are shown in each of the trough zones between the mounds. However, it should be understood that the number of rows in each trough zone and on each mound will vary and that the selection of the troughs and mounds to receive these rows will vary depending upon beach and lake bottom conditions. For example, only one row at each location could be used and some intermediate troughs and mounds may not receive the interceptors.

The seaweed 10, as best shown in FIG. 4, is composed of an anchor tube 11 of tough flexible water resistent plastics material, preferably sufficiently porous to pass water while retaining lake bed sediment. Each tube 11 anchors the bottom ends of a plurality of buoyant plastic finger sheets 12 spaced along the length of the tube.

The tubes 11 are partially filled as illustrated at 13 with lake bed sediment, such as sand and are thereby weighted down tightly on the lake bed bottom B. The tubes are preferably deployed in spaced parallel rows outwardly from the shoreline and generally parallel therewith on mounds M and in troughs T of the lake bed bottom B. As illustrated, three rows of seaweed 10 are anchored on each of two mounds M while two rows of seaweed 10 are anchored in the intermediate trough T between the mounds M.

As illustrated in FIGS. 4 and 5, the finger sheets 12 all terminate well below the still water level L of the water front. In addition, it will be noted that the height or length of the sheets 12 anchored in the trough T is much less than the height or length of the sheets anchored on the mounds M. As illustrated in FIG. 5, the center row of the three rows on the mounds M have sheets 12 of greater height than the adjacent rows but with the tops of these highest sheets still terminating at a depth D well below the still water line L. As illustrated by the arrowed line D', the adjacent shorter sheets on the mounds M terminate at increased depths to expose the top ends of the sheets in the central row. In a typical installation, the rows in each group will be about 10 feet apart as illustrated by the arrowed lines 14 in FIG. 5, the last row on a first mound M will be separated from the first row in the second group mounted in an adjacent trough T a distance 15 determined by the surveyed distance between the low point of the trough T and the descending side of the mound M. As also indicated by the arrowed line 16, the center row of the groups on adjacent mounds M will be separated a distance determined by the surveyed distance between the general apex of each mound M. In such a typical installation, the shorter finger sheets 12 on the mounds M will be about 6 feet high with the finger sheets of the central row being about 8 feet high and the sheets 12 mounted in the trough T will only be about 4 feet high. These heights, for example, would be useful in installations where the still water level L is about 12 to 14 feet above the tops of the mounds M. It will be appreciated that these dimensions will vary greatly depending upon the data obtained from the surveying of the beach profile since the installations will be positioned on selected adjacent mounds and troughs with fingers of selected heights to accommodate the conditions determined by the survey. It will also be understood that while the rows of the seaweed are generally parallel with the dry shoreline, conditions will exist where the mounds and troughs are in angular relation to the shoreline and under such conditions the rows will be deployed to angle outward from the shoreline.

As illustrated in FIGS. 6 and 7, the finger sheet 12 is generally rectangular in shape having a width of 2 to 4, preferably 3, feet with its lower end wrapped around the tube 11 as indicated at 17 and then heat sealed as indicated at 18 forming an open-ended pocket 19 snugly embracing the tube 11.

The top free end of the finger sheet 12 is turned down as indicated at 20 with its free edge heat sealed as indicated at 21 to a face of the sheet thereby forming a pocket 22. This pocket 22 receives low density floats such as hollow spheres, very light weight plastic material chunks or the like 23. The end edges of the pocket 22 are then heat sealed at 24 to trap a plurality of rows of these floats 23 in the upper or free edge of the sheet. The trapped floats greatly increase the buoyancy of the sheet and are sealed by the sheet against contamination or deterioration.

The pockets 19 at the bottom end of the sheet slidably receive the tube 11 and the sheets are spaced in end-to-end relation along the length of the tube as illustrated in FIG. 4 with the open spaces between the sheets varying to suit conditions but being generally in the order of 6 to 12 inches.

In an alternate arrangement shown in FIG. 8 the pocket 22 may be divided into a plurality of side-by-side compartments by heat seals 25 thereby further trapping the floats 23 against side movement.

In a further modified arrangement, sheets 25 illustrated in FIGS. 9 and 10 can be provided. As there shown, a plastic film or sheet about twice as long as the sheet 12 is wrapped at its transverse mid-section around and heat sealed at 26 to form a pocket 27 sized for receiving the tube 11. This, then, provides legs 28 in lapped relation extending upwardly from the heat seal 26 to their top free edges which are heat sealed together as indicated at 29. Then two or more elongated strips 30 of bubble pack plastic material are inserted between the legs 28, preferably adjacent the side edges thereof and heat seals 31 are formed alongside or over the side edges of the strips 30 to provide vertical pockets trapping and sealing the strips along the entire height of the sheet 25. The ends of these pockets of course can be sealed by the seals 26 and 29. The conventional bubble pack strips 30 have blisters or bubbles 31a trapping air rendering the finger sheet 25 very fuoyant without causing it to be stiff or rigid along its height.

In a further alternate arrangement a finger sheet 32 shown in FIG. 11 may be provided. As there shown a pocket 33 is provided at the top free edge of the sheet receiving a sheet 34 of blister or bubble pack material with a plurality of rows of blisters 34a across the width and along the height thereof. Heat seals 35 around the periphery of the pocket seal the blister pack.

It should be appreciated that many float arrangements for increasing the buoyancy of the sheets 12 can be provided without exposing the floats to the environment.

As illustrated in FIG. 12, the artificial seaweed 10 is conveniently folded and packed for deployment by flattening the tube 11 along the length thereof and by folding the finger sheets 12 lengthwise first in half as illustrated at 12a and then in quarter as illustrated at 12b thus forming a compact stack 12c on top of the flattened tube 11. Next the flattened tube 11 can be folded as indicated at 12d to move the stacks 12c on top of each other forming a compact package.

As illustrated in FIG. 13 the lengths of the seaweed are easily deployed into the water from a boat, barge or raft 40 having a deck or platform 41 on which compact packages of the folded seaweed lengths 10 can be unfolded. A pump 42 on the boat 40 has an inlet hose 43 deposited on the lake bottom to flow a stream of lake sediment slurry through a discharge hose 44 which is inserted lengthwise through a length of tube 11 as it trails from the back of the boat thereby filling the tube with sediment from the slurry with the water flowing through a screened forward end 45 of the tube and through the pores of the tube. The heavy sediment such as sand sinks the tube as it is filled and the boat is advanced over the surveyed zone retracting the hose 44 to the trailing end of the tube and discharging the same into the full tube length, causing the tube to settle on the bottom of the lake bed. The folded sheets will automatically unfold to rise upwardly in the water from the settled anchor tube.

When a length of the tube 11 has been filled with slurry, a coupling collar, hook, or other connector 46 can join the leading end of the tube 11 of the next folded pack to the trailing end of the deployed tube as the boat moves forwardly along the path where the seaweed is to be anchored. The hose 44 is then inserted through the trailing end of the next tube 11. Any number of seaweed unit lengths can be connected in end-to-end relation and successively filled with lake bottom sediment through the discharge hose 44 by retracting the hose from each tube as it is filled and by then transferring the leading end of the hose into the trailing end of the newly attached tube. It will thus be appreciated that the seaweed or anti-erosion devices of this invention are very easily deployed along predetermined surveyed paths to be firmly anchored on the sea bed in the exact positions controlled by the path of the boat 40.

It will be of course apparent to those skilled in this art that many modifications and variations may be effected without departing from the spirit and scope of the novel concepts of this invention.

I claim as my invention:

1. The method of accreting beaches on water fronts which comprises determining the still water level of the water front, determining the profile of the bottom beneath said water to identify trough and mound undulations at selected distances outwardly from the shoreline, deploying into the water on selected mound and trough undulations separate lengths of artificial seaweed each having a continuous flexible anchor and a plurality of upstanding buoyant fingers extending from said anchor along the length thereof to form a plurality of spaced rows of the seaweed outwardly from the shoreline, regulating the heights of the fingers to maintain the tops thereof below the determined still water level and allowing nature to develop sand bars outwardly from the shoreline and build up the beach along the shoreline.

2. The method of claim 1 including the step of deploying the seaweed on the selected mound and trough undulations in a plurality of adjacent parallel rows on each mound and trough and maintaining the heights of the fingers of the seaweed on the troughs below the heights of the fingers of the seaweed on the mounds.

3. The method of claim 1 including the step of controlling the heights of the fingers to provide short fingers extending from the troughs and longer fingers extending from the mounds.

4. The method of claim 1 wherein the anchor is a flexible porous tube, a slurry of bottom sediment is pumped into the tube as it is deployed, and the water is passed through the pores of the tube.

5. The method of claim 1 including the step of folding the lengths into stacks of folded fingers and overlapped length increments of the anchor and deploying the lengths from said stacks.

6. The method of claim 1 including the added steps of deploying into the water on a selected mound three parallel rows of seaweed and extending the height of the fingers of the center row above the tops of the fingers of the adjacent rows.

* * * * *